Sept. 16, 1952     J. H. IRVING     2,611,126
RADIO OBJECT LOCATING SYSTEM HAVING A HYPERBOLIC SWEEP
Filed Dec. 29, 1944     2 SHEETS—SHEET 1
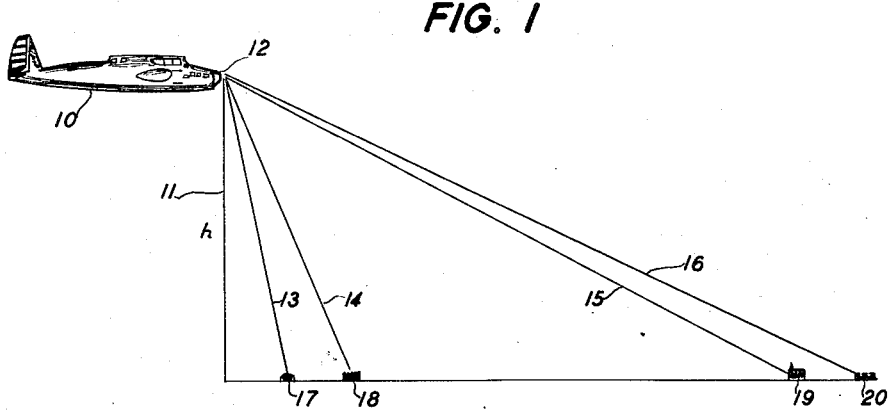
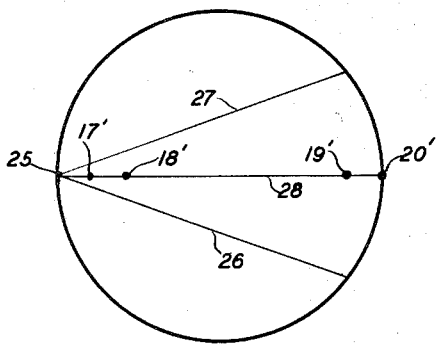
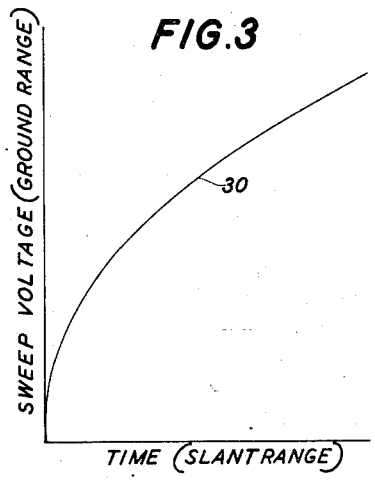
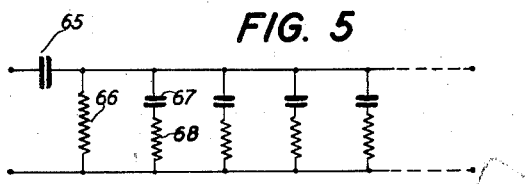
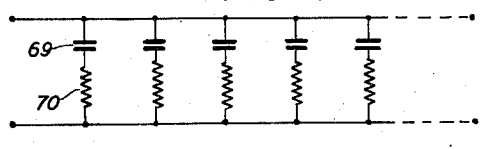
*INVENTOR.*
*JACK H. IRVING*
BY
*Attorney*

Sept. 16, 1952     J. H. IRVING     2,611,126
RADIO OBJECT LOCATING SYSTEM HAVING A HYPERBOLIC SWEEP
Filed Dec. 29, 1944     2 SHEETS—SHEET 2
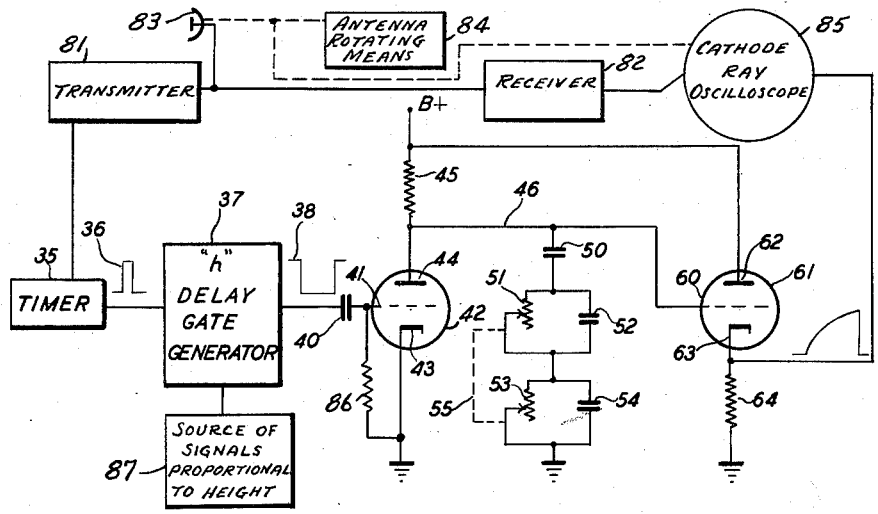
FIG. 4
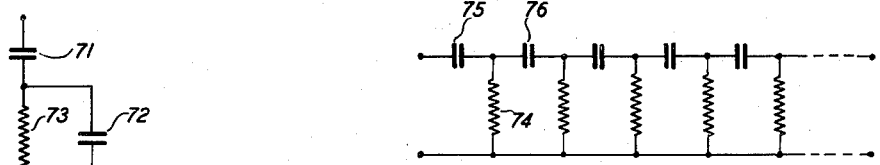
FIG. 8
FIG. 7
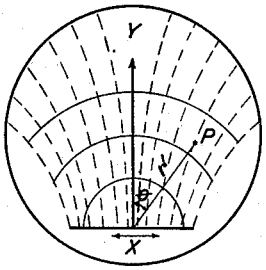
FIG-9
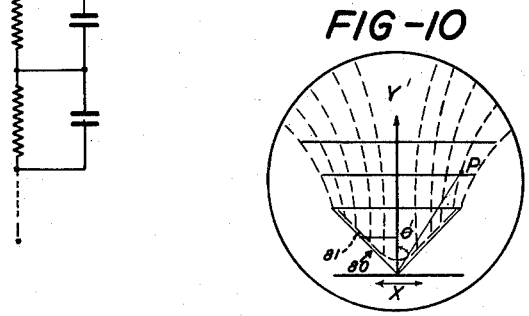
FIG-10
INVENTOR.
JACK H. IRVING
BY William D. Hall.
Attorney

Patented Sept. 16, 1952

2,611,126

UNITED STATES PATENT OFFICE

2,611,126

RADIO OBJECT LOCATING SYSTEM HAVING A HYPERBOLIC SWEEP

Jack H. Irving, Belmont, Mass., assignor, by mesne assignments, to the United States of America as represented by the Secretary of War Application December 29, 1944, Serial No. 570,412

4 Claims. (Cl. 343—11)

This invention relates to radio object-locating systems and particularly to a method of, and means for, providing map-like presentations of information obtained from airborne radio object-locating systems.

Target information in a system of this character may consist of the azimuth and range or the Cartesian coordinates of objects located on or near the earth's surface. Azimuth angles or abscissae are generally measured from the line of flight of the aircraft. Range is determined from the time intervals between the transmitted pulses and received echo pulses of the system in accordance with well known practice. In a Cartesian system the ordinate varies with the range according to mathematical relations which will be explained hereinafter. Images of the various objects scanned by a radio object-locating system are presented in their relative locations on a cathode ray tube indicator to afford a panoramic picture of that portion of the earth's surface which is being scanned.

In order to properly position the echo images on the viewing screen of the indicator the electron beam is moved, or swept, across the face of the cathode ray tube. In a plan position indicating (PPI) type of scan the cathode ray or electron beam is swept radially outward while being rotated about a reference point on the screen, the beam being rotated through a complete circle, or scanning back and forth through a sector thereof. In other types of scanning the movement of the electron beam may be governed by coordinated X and Y-sweeps. Each traversal of the electron beam across the screen of the indicator is timed in relation to the passage of transmitted radiant energy pulses through space, as is well known in the art. Upon receipt of an echo pulse from a target or other object by the system, the cathode ray beam is intensified to cause the appearance of a luminous spot in a position on the screen indicative of the location of the ground target.

In forming map-like presentations it is desirable that distances between objects in the picture shall be representative of the corresponding distances separating such objects on the earth's surface. The usual type of indicator sweep, which is linear with respect to time, is not suitable for this purpose. Intervals between transmitted and received pulses being proportional to slant range rather than ground range, use of a linear sweep in the cathode ray tube indicator would result in targets at short ground ranges (those having almost equal slant ranges) being shown too close together, while targets at distant ground ranges would appear too far apart due to the relatively greater differences between the slant ranges of such objects. Hence, an object of this invention is to obtain a presentation which more closely approaches a true map indication.

In systems of the character contemplated by this invention, scanning of the earth's surface is performed by a beam of pulsed radiant energy in the form of a thin sheet having a suitable energy distribution pattern. Such a beam may intersect the earth's surface along substantially straight lines during the scanning operation, or along curved paths which, for example, may be of hyperbolic configuration as in the system which is described in the co-pending application of Luis W. Alvarez, Serial No. 542,287, filed June 27, 1944, now Patent No. 2,480,208. In either event it is desirable that the sweep of the cathode ray beam shall follow a non-linear function of time so that the spacing of the object images displayed on the viewing screen will have at least a reasonably close correspondence to the actual distances between the various objects as measured on the ground.

Thus, another object of this invention is to provide a novel method of presentation in which the indicator sweep (for instance, the radial sweep of the PPI-scan or the Y-sweep of the Alvarez system) conforms substantially with the variation of ground-measured distances with respect to time as the radiant energy pulses are transmitted through space, and it is proposed to accomplish the foregoing by causing the sweep characteristic to have a substantially hyperbolic configuration.

A further object of the invention is to provide circuits of relatively simple character for generating voltages adapted to effect such hyperbolic sweeps.

The above and other objects in view will appear more fully from the following detailed description, accompanying drawings and appended claims.

In the drawings:

Fig. 1 is a diagrammatic view showing the geometry involved in the present invention;

Fig. 2 is a diagram of a PPI screen showing a true map indication of targets appearing in Fig. 1;

Fig. 3 is a curve showing the hyperbolic wave form of the sweep voltage employed to obtain the indication of Fig. 2;

Fig. 4 is a schematic diagram of a circuit adapted to generate a hyperbolic voltage;

Figs. 5 through 8 show various network combinations of capacitance and resistance adapted to generate voltages which vary with time in a hyperbolic manner;

Fig. 9 is a diagram of an indicator picture in a system such as referred to hereinabove, where coordinated X and Y-sweeps are employed to furnish the map indication; and Fig. 10 is a diagram of an indicator picture produced by a system which is a modification of the system referred to in connection with Fig. 9.

Referring now to Fig. 1, an aircraft 10 equipped with a radio object-locating system is shown flying at a height $h$ with reference to the earth's surface. Height $h$, represented by the vertical line 11, may be measured in any suitable manner and may, in fact, be determined from the radio object-locating system by measuring the time interval between a transmitted pulse and the first ground return echo.

The antenna of the radio object-locating system may be located within a suitable housing 12 in the nose of the aircraft 10. For purposes of illustration, the antenna here contemplated has a radiation beam pattern narrow in a horizontal plane and relatively wide in a vertical plane. Radiated energy is concentrated downwardly and forwardly of the aircraft so that it will impinge upon targets such as bridges, buildings, vessels, and so forth, situated on the earth's surface. Thus, energy rays such as those indicated diagrammatically by the lines 13, 14, 15 and 16 are directed toward targets such as 17, 18, 19 and 20 which, for purpose of facilitating the description of the invention, are assumed to lie on a straight line in the direction of flight of the aircraft 10. Furthermore, the distance on the ground between targets 17 and 18, which are relatively close to the aircraft 10, will be assumed equal to the distance separating targets 19 and 20, which are farther away. Pulses of electromagnetic energy are transmitted from the radiating antenna of the system in the nose 12 of the aircraft 10 and strike the various targets on the earth's surface, being reflected back in the form of echo pulses which are received by the object-locating apparatus. The time intervals between the transmitted pulse and the echo pulses reflected from targets such as 17 through 20 are measures of the slant ranges as 13 through 16, respectively, of these targets.

Fig. 2 illustrates the indicating screen of a type of PPI cathode ray tube. In this instance, a luminous spot 25 derived from a transmitted pulse and corresponding to the aircraft's location is positioned on the left periphery of the screen. The electron beam is moved radially with respect to spot 25 by means of sweep voltage applied to suitable beam deflection elements. In the case of a tube used for PPI indication, such elements generally take the form of electromagnetic deflection coils, the deflection coils being arranged to rotate about the tube in synchronism with the scanning antenna. Thus, the direction of the sweep path of the electron beam within the cathode ray tube corresponds to the direction in which the antenna system is radiating and receiving. Predetermined limits of antenna scan are diagrammatically indicated on the PPI screen by lines 26 and 27.

In the following description the beam-deflecting force provided to sweep the beam across the tube face will be referred to as sweep voltage. It is to be understood that if electromagnetic deflecting elements (coils) are used, the sweep voltage provided contemplates a corresponding sweep current flowing in the coils.

As the instantaneous direction of the antenna shown in Fig. 1 is straight ahead of the aircraft, the direction (or azimuth) of the beam is shown in Fig. 2 by the line 28 starting from spot 25 and passing through the center of the screen. Target echo signals which are reflected from targets 17, 18, 19 and 20 are applied to the grid of the PPI tube, thus to intensify the electron beam and provide luminous spot indications or target images on the screen. Spots corresponding to the targets shown are respectively indicated by 17', 18', 19' and 20'.

It will be remembered that the measured target distances 13, 14, 15 and 16, Fig. 1, are slant ranges. These distances comprise the hypotenuses of right triangles having height $h$ as a common leg and actual ground ranges as the respective other legs. It is desired that the positions of the luminous spots, Fig. 2, corresponding to the various targets shall indicate the true ground ranges of these targets with reference to the aircraft position spot 25. In this way a true map indication may be presented and equal ground distances such as 17—18 and 19—20 will appear as equal distances 17'—18' and 19'—20' on the cathode ray screen, regardless of the fact that the difference between the slant ranges 13 and 14, Fig. 1, is less than the difference between slant ranges 15 and 16. It will be seen, therefore, that a transformation between slant range and ground range is required in order to properly position the target image spots on the PPI tube in accordance with true map presentation.

It is proposed to achieve such a transformation by providing a sweep voltage for the cathode ray tube which has a substantially hyperbolic characteristic, this hyperbolic wave form being applied to the deflection elements of the cathode ray tube to provide true map PPI indication. The height $h$ may be introduced as a factor in the transformation so that the hyperbola will have proper curvature to enable continuous solution for ground ranges.

The hyperbolic curce 30 of Fig. 3 represents the sweep voltage wave form used. To properly sweep the beam from spot 25 (Fig. 2), the hyperbolic sweep voltage is applied to the cathode ray tube at the time when the first ground return echo is received. Sweep voltage 30 increases rapidly at the short ranges to provide for proper ground range positioning of spots as 17' and 18' and then increases less rapidly with an increase in range to properly position the more distant spots as 19' and 20'. Thus the use of a hyperbolic sweep voltage provides continuous solution of a series of right triangles to position the echo spots on the PPI screen in accordance with true ground range.

A generator for providing hyperbolic voltage sweeps is shown in Fig. 4. A timer 35 connected to transmitter 81 provides a voltage pulse 36 which may be synchronized with an outgoing transmitted pulse radiated by directional antenna 83, which is rotated in azimuth by antenna rotating means 84. Pulse 36 is fed into circuits indicated by the block 37. A source 87, feeds into block 37 signals having a characteristic proportional to the height of the aircraft. One of the circuits in block 37 causes a time delay of the pulse, the amount of time delay being proportional to the height factor $h$. As mentioned, sweep voltage is not applied to the cathode ray tube until such time as the height-indicating first ground return is received at the aircraft.

Delay circuits are well known in the art and need not be described in detail.

Circuit 37 also includes a voltage generator adapted to provide a substantially rectangular wave of negative voltage shown by 38. An ordinary multivibrator triggered by the pulse 36 (after this pulse has been delayed) may be used for this purpose. Wave 38 is characterized by a steep leading edge and by a time duration which is long compared to the time duration of the hyperbolic sweep voltage.

Pulse 38 is applied through a blocking capacitance 40 to the grid 41 of a switch tube 42, which is returned to ground through grid leak resistance 86. Cathode 43 may be grounded while anode 44 is connected through a large load resistance 45 to a suitable source of positive potential. Anode 44 is connected to a line 46 between which line and ground is connected an R–C network.

The R–C network comprises a capacitance 50, a variable resistance 51 shunted by a capacitance 52, and a variable resistance 53 shunted by a capacitance 54. As shown, capacitance 50 and R–C units 51, 52 and 53, 54 are cascaded in series between the line 46 and ground. Variable resistances 51 and 53 may be actuated by a common control diagrammatically shown by the broken line 55.

Line 46 is connected to the control grid 60 of a cathode follower 61 whose anode 62 is connected to a source of positive potential. Cathode 63 is connected to ground through a load resistance 64, with the output of the circuit being taken across the resistance 64 and applied to the deflection means of cathode ray oscilloscope 85.

Normally, the switch tube 42 is conducting; hence the difference of potential between the line 46 and ground may be comparatively small, and for all practical purposes may be assumed to be zero. Thus, the capacitances 50, 52 and 54 are normally in a discharged condition. Upon the application of a negative pulse 38 to grid 41, the switch tube 42 is cut off. This removes the shunt from the network of resistance and capacitance elements. Because of the R–C combination between the line 46 and ground, the voltage in line 46 rises in accordance with the characteristics of the combination. The voltage developed by the network combination is a result of combining a plurality (in this instance three) of exponential condenser-charging curves. The result of combining several such exponential curves is to produce an output voltage which varies with time in a manner determined jointly by all the R–C values of the network, together with any other resistances such as 45 in circuit therewith. These values may be so chosen that the output wave form of "voltage (or current) versus time" is substantially hyperbolic in shape, as shown in Fig. 3, at least within a certain time interval.

For obtaining a good hyperbolic curve it is desirable that the current through the R–C network remain substantially constant throughout the period in which the wave form is utilized. This may be accomplished by employing a resistor 45 of large value, as noted hereinabove, or providing a feedback path from the output of tube 61 through a condenser to the R–C network, in which case a diode is inserted between resistor 45 and the positive voltage source, in the familiar manner.

To obtain a PPI scan the hyperbolic sweep is connected to provide a radial deflection of the electron beam of cathode ray oscilloscope 85. Mechanical coupling is provided between antenna rotating means 84 and cathode ray oscilloscope 85 for rotating the hyperbolic sweep in synchronism with antenna 83. Echo pulses picked up by antenna 83 are detected by receiver 85 and applied to cathode ray oscilloscope 85 to intensity modulate the electron beam thereof.

In the PPI type of scan (Fig. 2) the desired configuration of the hyperbolic waveform is one which follows the mathematical relation, $$r' = \sqrt{r^2 - h^2}$$

where $r'$ is the ground range, $r$ the slant range and $h$ the height. In this equation $h$ is generally a constant, since the aircraft is assumed to be flying at uniform altitude. The variable resistances as 51 and 53, Fig. 4, are adjusted to introduce the hyperbolic parameter corresponding to the height factor $h$. It will be understood that means may be provided for automatically changing the values of these variable resistances in the event that the height is a variable quantity. The range $r$ is a linear function of time equal to the velocity of light multiplied by one-half the time elapsing from the transmission of a radiant energy pulse to the receipt of an echo signal.

The R–C combination, comprising elements 50 through 55, Fig. 4, is one form of network for generating hyperbolic sweep pulses. Others are illustrated in Figs. 5, 6, 7, and 8. Each of these networks is adapted to be employed in a manner similar to the network just described for producing the desired hyperbolic pulses.

Referring to Fig. 5, a condenser 65 is connected in series with a parallel combination of a resistor 66 and a plurality of resistance-capacitance paths such as that comprising the series-connected condenser 67 and resistor 68. These resistance-capacitance units may have different time constants and as many may be utilized as necessary for obtaining the desired wave form.

In Fig. 6 a plurality of individual series-connected resistance and capacitance units 69—70 are connected together in parallel for this purpose.

Fig. 7 shows a general case of the circuit illustrated in Fig. 4, wherein a condenser 71 is connected in series with a plurality of resistance-capacitance units, each of which comprises a condenser such as 72 in parallel with a resistance such as 73, the various resistance-capacitance units being in series with each other.

The modification shown in Fig. 8 illustrates another manner of connecting the resistance-capacitance units in which parallel resistance paths such as 74 are interspersed between series-connected condensers such as 75 and 76.

In Fig. 9 there is diagrammatically illustrated the screen of a cathode ray tube indicator in a system where the radiant energy beam is in the form of a cone having an axis transverse to the line of flight of the aircraft, the cone angle being continuously varied so that the energy beam intersects the earth's surface along a series of hyperbolic paths. The cathode ray beam traces on the indicator screen, indicated diagrammatically by broken lines in Fig. 9, correspond to the hyperbolic lines of intersection. Such a system is described in the Alvarez application mentioned hereinabove.

In accordance with the present method it is proposed to utilize both X and Y-sweeps operating concurrently on the cathode ray beam to form the panoramic presentation on the indicating screen. The X-sweep is substantially a sawtooth pulse, the amplitude of which varies as the radiant energy beam scans in azimuth so as to continually shift the starting point of the Y-sweep trace to the right or left as the case may be. The Y-sweep in this embodiment follows the relation:

$$y=\sqrt{r^2-h^2-x^2}=\sin a\sqrt{r^2-(h\csc a)^2}$$

where $x$ and $y$ are Cartesian coordinates of the target with reference to the nose 12 of the aircraft 10, Fig. 1, $h$ is the height of the aircraft 10, $r$ is the instantaneous value of slant range or ½ (velocity of light multiplied by elapsed time), and $a$ is the half angle of the cone of radiation. The height $h$ will be assumed constant for present purposes, and inasmuch as $a$ varies slowly (about one cycle per second), it too may be considered constant during the very brief time interval occupied by the sweep. Hence, the resulting equation is that of a hyperbola in which $y$ and $r$ are the variable quantities. Thus, circuits such as are shown in Figs. 4 to 8 may be utilized to advantage, provided means are included in the apparatus to vary the time constants and amplitude in the proper way with $h$ and $a$.

In the embodiment of Fig. 9 the ground range $r'$ of each target such as P shown in the display is proportional to the actual ground range of the target, which is given by the relation:

$$r'=\sqrt{x^2+y^2}$$

In another embodiment, Fig. 10, a simplified Y-sweep is used which follows the relation: $y'=\sqrt{r^2-h^2}$. In this case the value of the ground range $r'$ is indicated by the ordinate $y'$, while the azimuth angle $\theta'$ indicated in the display of Fig. 10 is related to the true azimuth angle $\theta$ of the target P by the expression: $\tan \theta' = \sin \theta$.

In the modified map type of presentation illustrated in Fig. 10, the Y-sweep is essentially hyperbolic for any particular value of $h$, being independent of $x$. The base of the picture comprising the initial ground echo images of the various sweeps is theoretically V-shaped as indicated by the line 80. Actually this is distorted somewhat as indicated by the broken line 81, Fig. 10, due to the pre-start which is necessary when electromagnetic deflecting elements are employed in the cathode ray tube. Lines of equal range will be horizontal in Fig. 10 as compared with concentric circles in Fig. 9. Radial lines on the ground are preserved as radial lines in the display for both types of presentation. In plotting a bombing run with the aid of a presentation such as shown in Fig. 10, a scale may be provided across the top of the display properly calibrated to compensate for the distortion in azimuth angle. A ruled straight-edge pivoted about the origin of the display is provided for enabling the operator to direct the course of the aircraft. Measures for stabilizing against roll of the aircraft may also be incorporated in the system, as described in the aforesaid application, Serial No. 542,287, filed June 27, 1944.

There has been illustrated and described herein a general method of map presentation involving the use of indicator sweep-pulses having substantially hyperbolic characteristics. Several specific applications of such a method as well as the means for performing the required functions have been disclosed. An important feature of the invention is the provision of relatively simple networks for effecting hyperbolic sweeps in cathode ray tube circuits, thereby eliminating certain disadvantages which attended the use of involved sweep circuits employing a number of tubes for this purpose. It is to be understood that the foregoing embodiments of the invention are exemplary only and that the basic concept includes all variations and modifications which may be made by persons skilled in the art within the purview of the appended claims.

What is claimed is:

1. An airborne plan position object detection system for displaying the ground pattern comprising radio wave transmitting and receiving means and cathode-ray tube presentation means, means for intermittently energizing said radio transmitting means, means including a time-constant network for generating sweep pulses of hyperbolic wave form in timed relation with said intermittent energization, delay means to delay the initiation of said sweep pulses by an amount which is proportional to the altitude of said system, and means energized by said sweep pulses to deflect the beam of said cathode-ray tube to provide a time base.

2. An airborne plan position object detection system for displaying a ground pattern, comprising radio wave pulse transmitting and receiving means and a cathode-ray tube having means therein for periodically sweeping the electron beam in synchronism with the pulse transmission, said last-named means comprising a network of electrically interconnected circuits having different transient properties to provide a hyperbolic wave, delay means to delay the initiation of each cycle of said hyperbolic wave for an interval equal to the time required for a wave to travel from said transmitting means to ground and back to said receiving means.

3. An airborne plan position object detection system for displaying the ground pattern, comprising radio wave pulse transmitting and receiving means including antenna means beamed in a vertical plane, means to rotate said antenna means about a vertical axis, a cathode-ray tube indicator, means to periodically deflect the electron beam of said tube along one coordinate in synchronism with the rotation of said antenna means, and means for deflecting said electron beam along a second coordinate in synchronism with the transmission of each pulse, said last-named means comprising a hyperbolic wave generating circuit, and delay means for retarding the initiation of each cycle of said hyperbolic wave so that it is initiated coincidentally with the arrival of the first echo from the ground.

4. In combination with an airborne pulse echo system wherein energy pulses are transmitted toward ground and received echo pulses are displayed upon a cathode-ray tube along a time base synchronized with the transmitted pulses; means to generate auxiliary pulses synchronously with each transmitted pulse, means to delay the timing of said auxiliary pulses for a period proportional to the altitude of said pulse echo system, first and second electron tubes each having at least anode, cathode and grid electrodes, means to impress said delayed pulses upon the grid of said first electron tube, a load resistor in the anode circuit of said first electron tube, means to distort said pulses into hyperbolic waves, said last means comprising at least a pair of networks connected in series, each of said networks comprising a condenser connected in parallel with a variable resistor, said resistors being ganged for simultaneous variation, a capacitor coupling said networks to said first electron tube anode and to the grid of said second electron tube, and means to derive an output from the cathode of said second electron tube, and means controlled by said output to deflect the beam of said cathode-ray tube.

JACK H. IRVING.

REFERENCES CITED

The following references are of record in the file of this patent:

UNITED STATES PATENTS

| Number | Name | Date |
|---|---|---|
| 1,315,539 | Carson | Sept. 9, 1919 |
| 1,752,228 | Brillouin | Mar. 25, 1930 |
| 1,801,342 | Gannett et al. | Apr. 21, 1931 |
| 1,961,334 | Burton | June 5, 1934 |
| 2,422,204 | Meacham | June 17, 1947 |
| 2,426,216 | Hight | Aug. 26, 1947 |
| 2,426,217 | Hoisington | Aug. 26, 1947 |
| 2,455,283 | Valley | Nov. 30, 1948 |
| 2,457,396 | Pollard | Dec. 28, 1948 |

FOREIGN PATENTS

| Number | Country | Date |
|---|---|---|
| 108,556 | Australia | Sept. 14, 1939 |